United States Patent
Hirata et al.

(10) Patent No.: US 8,315,755 B2
(45) Date of Patent: Nov. 20, 2012

(54) DRIVE CONTROL APPARATUS AND DRIVE CONTROL METHOD FOR HYBRID VEHICLE

(75) Inventors: Takeshi Hirata, Sagamihara (JP); Hiroshi Kaneko, Isehara (JP)

(73) Assignee: Nissan Motor Co., Ltd., Yokohama-shi, Kanagawa (JP)

(*) Notice: Subject to any disclaimer, the term of this patent is extended or adjusted under 35 U.S.C. 154(b) by 384 days.

(21) Appl. No.: 12/812,810

(22) PCT Filed: Jan. 5, 2009

(86) PCT No.: PCT/IB2009/000020
§ 371 (c)(1), (2), (4) Date: Jul. 14, 2010

(87) PCT Pub. No.: WO2009/090524
PCT Pub. Date: Jul. 23, 2009

(65) Prior Publication Data
US 2011/0313602 A1 Dec. 22, 2011

(30) Foreign Application Priority Data
Jan. 16, 2008 (JP) ................................. 2008-006967

(51) Int. Cl.
*B60W 20/00* (2006.01)
(52) U.S. Cl. .................. 701/22; 180/65.28; 180/65.285; 320/116; 320/104; 320/132
(58) Field of Classification Search ..................... 701/22; 180/65.28, 65.285, 65.29; 320/116, 104, 320/132; *B60W 20/00*
See application file for complete search history.

(56) References Cited

U.S. PATENT DOCUMENTS

| | | | | |
|---|---|---|---|---|
| 6,608,482 B2* | 8/2003 | Sakai et al. | | 324/426 |
| 6,828,758 B2* | 12/2004 | Ishishita | | 320/116 |
| 6,839,621 B2* | 1/2005 | Kaneko | | 701/112 |
| 7,091,700 B2* | 8/2006 | Kadouchi et al. | | 320/132 |
| 7,708,095 B2 | 5/2010 | Hirata | | |
| 7,830,126 B2* | 11/2010 | Kawahara et al. | | 320/160 |
| 8,116,924 B2* | 2/2012 | Wakashiro et al. | | 701/22 |
| 8,200,382 B2* | 6/2012 | Hahn | | 701/22 |
| 8,210,294 B2* | 7/2012 | Hughes et al. | | 180/65.285 |
| 8,224,544 B2* | 7/2012 | Sah et al. | | 701/68 |
| 2005/0247495 A1* | 11/2005 | Tabata et al. | | 180/65.2 |

(Continued)

FOREIGN PATENT DOCUMENTS
CN 1868791 A 11/2006
(Continued)

*Primary Examiner* — Tuan C. To
(74) *Attorney, Agent, or Firm* — Young Basile

(57) ABSTRACT

Disclosed herein are embodiments of a drive control apparatus for hybrid vehicles and methods of driving control. In one such embodiment, a drive controller is configured to calculate a basic motor-generator torque value based on the basic engine torque value and the target driving torque value, set a target engine torque to be the basic engine torque value and set a target motor-generator torque as the basic motor-generator torque value when the state of charge of the battery is within an allowable range, set the allowable range of the battery to be smaller when the transmission is performing the shift change operation and execute a basic value shift process when the battery is deviated from the allowable range. The basic value shift process suppresses deviation of the battery by shifting the target engine torque from the basic engine torque value and the target motor-generator torque from the basic motor-generator torque value.

20 Claims, 14 Drawing Sheets

U.S. PATENT DOCUMENTS

| | | |
|---|---|---|
| 2006/0289214 A1* | 12/2006 | Katsuhiro et al. ............ 180/65.4 |
| 2007/0187161 A1 | 8/2007 | Kiuchi |
| 2007/0265762 A1* | 11/2007 | Suzuki ......................... 701/102 |
| 2008/0220937 A1 | 9/2008 | Nozaki et al. |
| 2008/0293538 A1 | 11/2008 | Saito et al. |

FOREIGN PATENT DOCUMENTS

| | | |
|---|---|---|
| CN | 1956860 A | 5/2007 |
| JP | 10-257610 | 9/1998 |
| JP | 2006-094691 A | 4/2006 |
| JP | 2007-216762 A | 8/2007 |

* cited by examiner

DRIVE CONTROL APPARATUS AND DRIVE CONTROL METHOD FOR HYBRID VEHICLE

CROSS-REFERENCE TO RELATED APPLICATION

This application claims priority from Japanese Patent Application Serial No. 2008-006967, filed Jan. 16, 2008, which is incorporated herein in its entirety by reference.

TECHNICAL FIELD

The present invention relates to a drive control apparatus and methods for controlling the drive of a hybrid vehicle in which an internal combustion engine and a motor-generator are installed as a drive source.

BACKGROUND

In recent years, hybrid vehicles equipped with a plurality of drive sources for improving the fuel consumption and suppressing the amount of exhaust gas are attracting attention from a point of view of environmental protection. Hybrid vehicles are known to have an engine and a motor/generator. In such a hybrid vehicle, a stepped automatic transmission can be employed to improve the fuel consumption and the like.

Unexamined Japanese Patent Publication No. 10-257610 discloses a control apparatus for smoothly controlling the drive of a hybrid vehicle equipped with a stepped transmission. This control apparatus reduces shift shock by controlling the input RPM of the transmission using the torque of a motor/generator. With this control apparatus, the RPM of the motor/generator traces a desired target RPM during shift change, thereby controlling the input RPM of the automatic transmission.

BRIEF SUMMARY

Disclosed herein are drive control apparatuses for hybrid vehicles and methods for controlling the hybrid vehicles. One embodiment of a drive control apparatus disclosed herein comprises an engine, a motor-generator, a battery for supplying and receiving electric power to and from the motor-generator, a transmission configured to perform a normal operation and a shift change operation and a controller. The controller is configured to detect the normal operation and the shift change operation of the transmission, determine a state of charge of the battery, calculate a target driving torque value and a basic engine torque value based on a driving condition of the vehicle, calculate a basic motor-generator torque value based on the basic engine torque value and the target driving torque value, set a target engine torque to be the basic engine torque value and set a target motor-generator torque as the basic motor-generator torque value when the state of charge of the battery is within an allowable range, set the allowable range of the state of charge of the battery to be smaller when the transmission is performing the shift change operation than when the transmission is performing the normal operation and execute a basic value shift process when the state of charge of the battery is deviated from the allowable range. The basic value shift process suppresses deviation of the state of charge of the battery by shifting the target engine torque from the basic engine torque value and shifting the target motor-generator torque from the basic motor-generator torque value.

Embodiments of a method for controlling a hybrid vehicle are disclosed herein, wherein the hybrid vehicle has an engine, a motor-generator, a battery for supplying and receiving electric power to and from the motor-generator, and a transmission configured to perform a normal operation and a shift change operation. The drive control method comprises, for example, detecting the normal operation and the shift change operation of the transmission, determining a state of charge of the battery, calculating a target driving torque value and a basic engine torque value based on a driving condition of the vehicle, calculating a basic motor-generator torque value based on the calculated basic engine torque value and the calculated target driving torque value, setting a target engine torque to be the basic engine torque value and setting a target motor-generator torque as the basic motor-generator torque value when the determined state of charge of the battery is within an allowable range, setting the allowable range of the state of charge of the battery to be smaller when the transmission is performing the shift change operation than when the transmission is performing the normal operation and executing a basic value shift process when the state of charge of the battery is deviated from the allowable range, wherein the basic value shift process suppresses deviation of the state of charge of the battery by shifting the target engine torque from the basic engine torque value and shifting the target motor-generator torque from the basic motor-generator torque value.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

Figure 1:
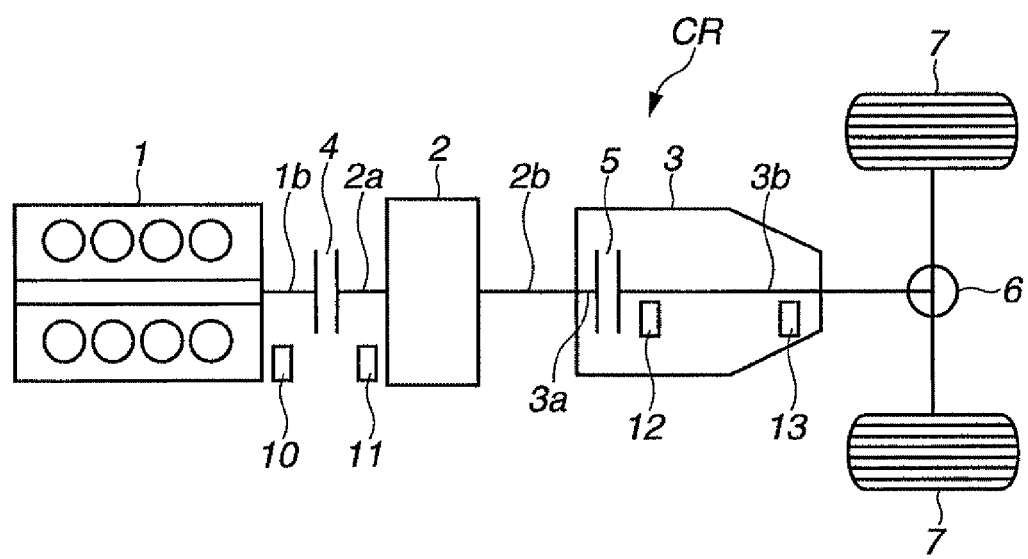
FIG. 1 is a schematic view showing a powertrain for a hybrid vehicle to which a drive control apparatus according to an embodiment herein is applied.

The control apparatus according to Unexamined Japanese Patent Publication No. 10-257610 controls the input RPM of the transmission by utilizing the torque based on the motor/generator and smoothes the shift change operation of the hybrid vehicle. The motor/generator can perform start and stop in a shorter time as compared with the engine. Further, the motor/generator also can produce both positive and negative torques (power torque and regenerative torque). Accordingly, in a hybrid vehicle utilizing a structure for inputting a combined torque that is the sum of an engine torque and a motor/generator torque together to the transmission, the input RPM of the transmission can be controlled with efficiency by controlling the drive of the motor/generator and thereby changing the torque suitably.

However, this technique does not consider the state of charge (SOC) of a battery, which varies every moment when the hybrid vehicle is actually used. The battery is connected to the motor/generator and charged or discharged in accordance with the driving condition of the motor/generator. Namely, when the motor/generator has functioned as a drive source for the vehicle, the electric power of the battery is consumed so that the charging level is lowered. On the other hand, when the motor/generator has functioned as a generator, the electric power is stored in the battery so that the charging level is elevated. The motor/generator produces positive and negative torques in response to the output request on the hybrid vehicle side. Accordingly, there occurs a case where the state of charge (SOC) of the battery is deviated to the overcharge side or to the overdischarge side.

In the case, as described above, that the state of charge of the battery has been deviated to either of overcharge or overdischarge, the output range in which the motor/generator can be used is limited, thus making it difficult to control the RPM of the transmission. At this time, the RPM control of the transmission is performed by only the torque on the engine side. However, if there exists a case where the motor/generator can be used and a case where it cannot be used (i.e., a case where the control is dealt with by only the engine), the shift change time and the intensity of shift shock vary, thus making it difficult to perform the drive control of the hybrid vehicle.

With respect to the above-described problem, it is considered to secure use of the motor/generator by monitoring the state of charge of the battery and holding it in its standard state, or the like. However, constant execution of such a countermeasure not only causes input/output of electric power at all times but may be accompanied by variations of operation timings of the engine and the motor/generator, thus incurring deterioration of the fuel consumption.

Accordingly, embodiments of the invention propose an apparatus and method that eliminates both the conventional problem and the problem that arises when the countermeasure against that problem is taken.

Embodiments of this invention will be described in detail with reference to the drawings.

FIG. 1 schematically shows a powertrain for a hybrid vehicle CR to which a drive control apparatus according to an embodiment disclosed herein is applied. An output shaft $1b$ of an engine 1 and an input shaft $2a$ of a motor/generator 2 are connected by way of a first variable torque capacity clutch 4. The output shaft $2b$ of the motor/generator (MG) 2 and an input shaft $3a$ of an automatic transmission 3 are connected. On the opposite side of an output shaft $3b$ of the automatic transmission 3 are positioned a pair of driving wheels 7 by way of a differential gear 6.

The automatic transmission 3 is a stepped automatic transmission in which a gear ratio of limited stages, such as five forward speeds and one reverse speed, can automatically be shifted. Within the automatic transmission 3 is included at least one torque capacity variable clutch mechanism that supports torque transmission that varies depending upon a state of shift position for shift change. This hybrid vehicle CR employs a second clutch 5 as one of the clutch mechanisms. A combined torque is input to the input side of the automatic transmission 3. The combined torque is the sum of a torque (power) of the engine 1 inputted by way of the first clutch 4 and a torque inputted from the motor/generator 2. The combined torque is inputted to a stepped shift change section of the transmission 3 and its output is finally transmitted to the tires 7. The first clutch 4 and second clutch 5 can each be a wet-type multi-plate clutch capable of controlling an oil flow rate and oil pressure continuously by means of a proportional solenoid, for instance.

In the powertrain system of the hybrid vehicle CR shown in FIG. 1, two drive modes, for instance, can be set depending upon the connecting condition of the first clutch 4. When the first clutch 4 is in a disconnected condition, the hybrid vehicle CR operates in an electric (EV) drive mode, running by only the power of the motor/generator 2. When the first clutch 4 is in a connected condition, the hybrid vehicle CR operates in a hybrid (HEV) drive mode, running by the power of the engine 1 and the motor/generator 2 combined. The motor/generator 2 is connected to the battery 9 (see FIG. 2) that is charged or discharged depending upon a driving condition of the motor/generator 2.

The hybrid vehicle CR is provided with an engine rotation sensor 10 for detecting RPM of the engine 1, a motor/generator rotation sensor 11 for detecting RPM of the motor/generator 2, an automatic transmission input rotation sensor 12 for detecting input shaft RPM of the automatic transmission 3, and an automatic transmission output rotation sensor 13 for detecting output shaft RPM of the automatic transmission 3. A simplified diagram of the inside of the transmission 3 is shown in FIG. 1 with a gear set that realizes a stepped shift change structure disposed between the input rotation sensor 12 and the output rotation sensor 13. The outputs of the sensors 10 to 13 are supplied to a drive controller that will be described later. The controller uses the outputs of the sensors 10 to 13 for executing a smooth shift change operation. The structure of the hybrid vehicle CR shown in FIG. 1 is an example, and the invention disclosed herein is not limited thereto. For example, the description above uses the clutch mechanism within the transmission 3 as the second clutch 5, but this is not limiting. Instead, a new clutch may be provided to either of the input shaft or the output shaft of the transmission 3 to serve as the second clutch 5.

Figure 2:
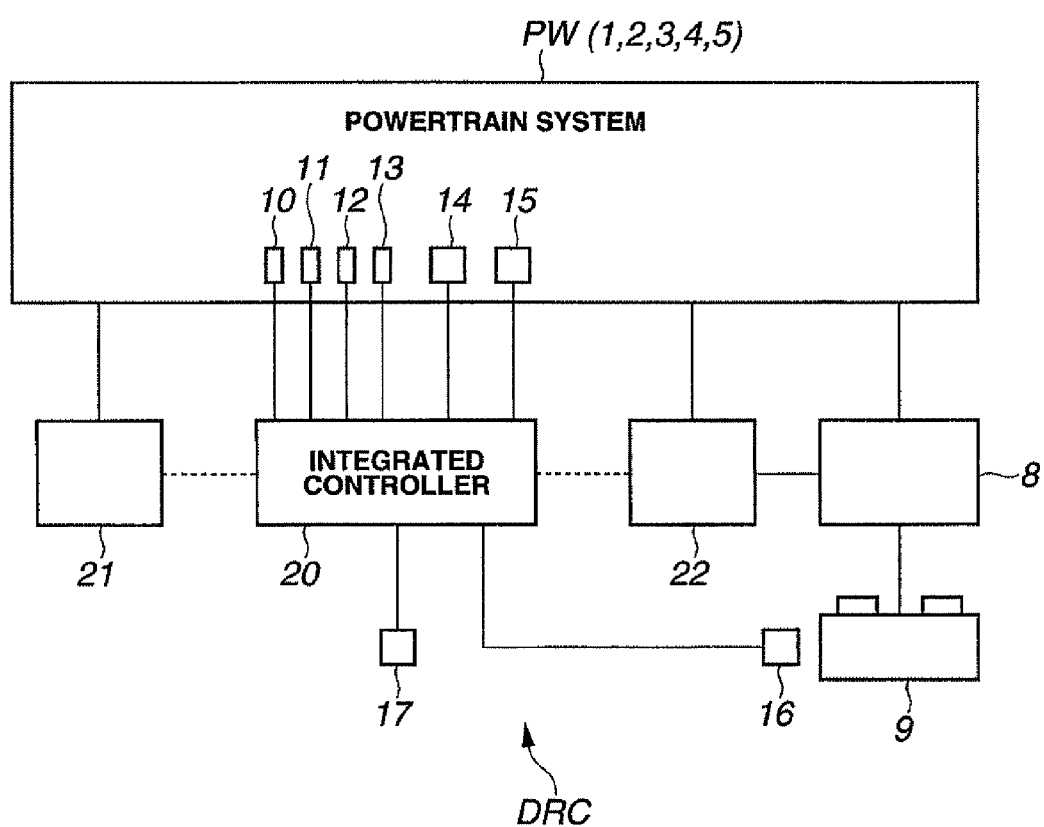
FIG. 2 is a block diagram of the drive control apparatus of the embodiment, applied to the hybrid vehicle shown in FIG. 1.

FIG. 2 is a block diagram showing a drive control apparatus DRC of this embodiment, which is applied to the hybrid vehicle CR of FIG. 1. In FIG. 2, the above-described powertrain system that is installed on the hybrid vehicle CR is simply represented by one block PW. The block PW includes the engine 1, motor/generator 2, stepped automatic transmission 3, first clutch 4 and second clutch 5. Within the block PW are also shown the engine rotation sensor 10, motor/generator rotation sensor 11, automatic transmission input rotation sensor 12 and automatic transmission output rotation sensor 13, which are arranged for detecting the condition of the powertrain system as described with reference to FIG. 1.

The drive control apparatus DRC includes an engine controller 21 for controlling the drive of the engine 1 and a motor controller 22 for controlling the drive of the motor/generator 2. The motor/generator 2 is connected to an inverter 8 and a battery 9 for storing electrical energy, both being controlled by the motor controller 22. Since the motor/generator 2 produces power torque (positive torque) when it functions as a drive source for driving the hybrid vehicle CR, the electrical power of the battery 9 is consumed (the battery is discharged) so that the state of charge is lowered. In contrast, when regenerative torque (negative torque) is produced due to braking of the hybrid vehicle CR, the motor/generator 2 functions as a generator, and electrical power is stored (the battery is charged) in the battery 9 so that the state of charge is elevated.

The drive control apparatus DRC is provided with an integrated controller 20 as control means for controlling the above-described structure entirely, and the engine controller 21 and the motor controller 22 are controlled by the integrated controller 20. The controllers 20, 21, 22 are implemented by, for example, conventional engine control units such as is known in the art. Each can thus be a microcomputer including a random access memory (RAM), a read-only memory (ROM) and a central processing unit (CPU), along with various input and output connections. Generally, the control functions and/or sections described herein and associated with the respective controllers are performed by execution by the CPU of one or more software programs stored in ROM. Of course, some or all of the functions can be implemented by hardware components. Moreover, although several controllers are shown, the functions can be combined into a single controller.

Further, the powertrain system includes a solenoid valve 14 for driving the first clutch 4 by oil pressure and a solenoid valve 15 for driving the second clutch 5 by oil pressure, and the drive of those valves is also controlled by the integrated controller 20. Further, outputs produced from an APO sensor 17, which detects an opening degree of an accelerator of the hybrid vehicle CR, and a SOC sensor 16, which detects the state of charge (SOC) of the battery 9, are supplied to the drive control apparatus DRC. The SOC sensor 16 detects, for example, voltage, electric current and the like as data that indicates the state of charge of the battery 9.

The integrated controller 20 selects a drive mode that applies a driving force required by a driver on the basis of the accelerator opening degree (APO), state of charge (SOC) of battery, vehicle speed (VSP) (proportional to output shaft RPM of transmission) and the like. At this time, the integrated controller 20 outputs a target motor/generator torque or target motor/generator RPM instruction to the motor/generator 22, a target engine torque instruction to the engine controller 21 and drive signals to the solenoid valves 14 and 15.

Figure 3:
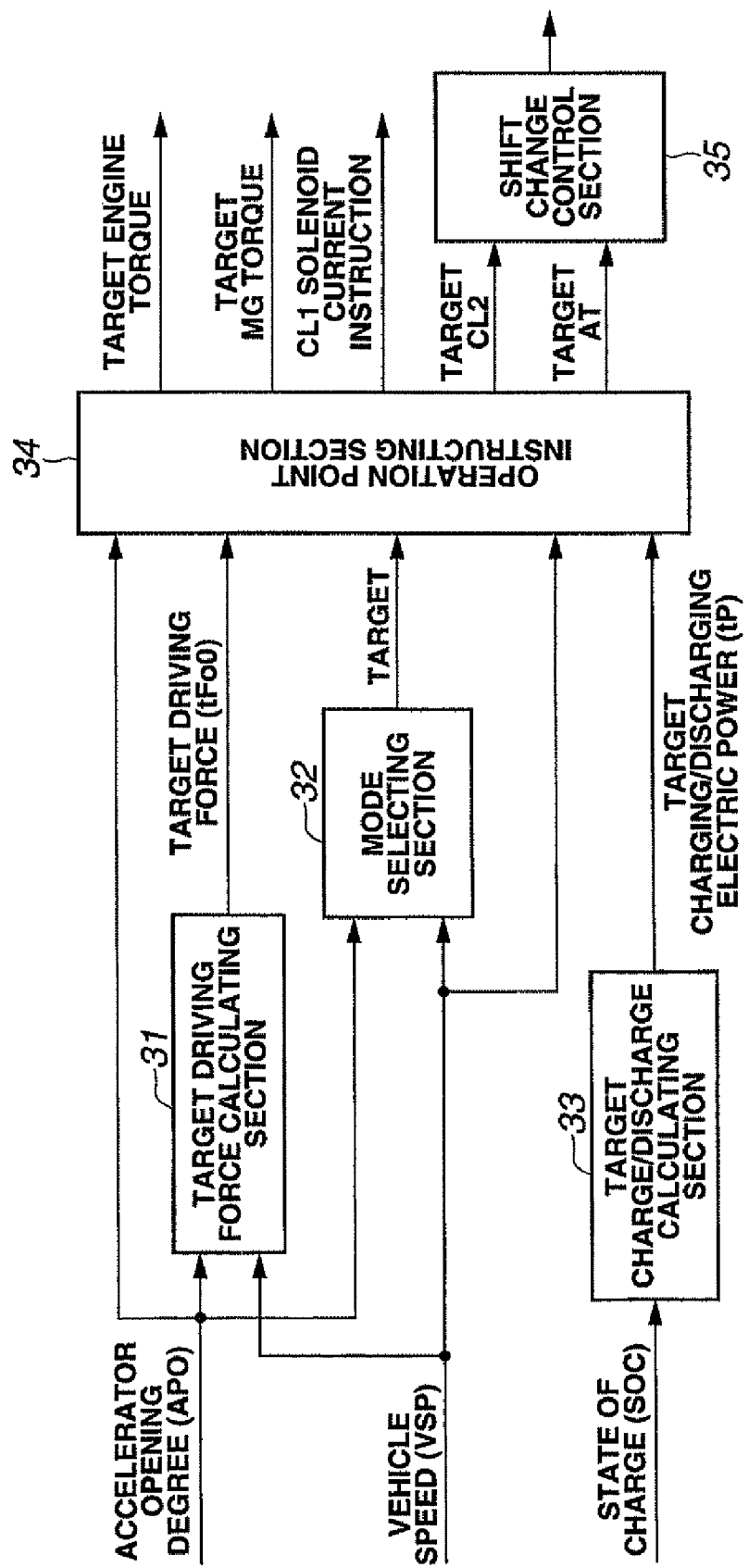
FIG. 3 is a functional block diagram collectively showing the conditions of processes by an integrated controller.

Further, referring to FIG. 3, basic control by the integrated controller 20 will be described. The control by the integrated controller 20 is arithmetically processed, for example, every 10 ms.

Figure 4:
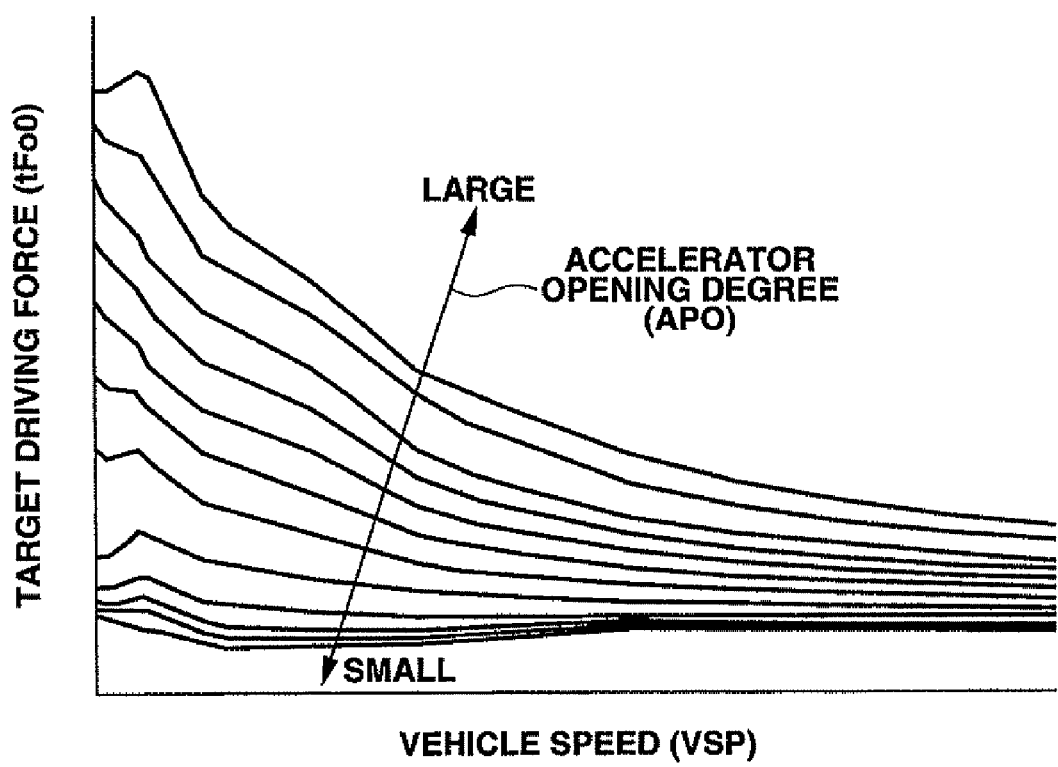
FIG. 4 is a graph showing an example of a target driving force map to which the integrated controller refers.
Figure 5:
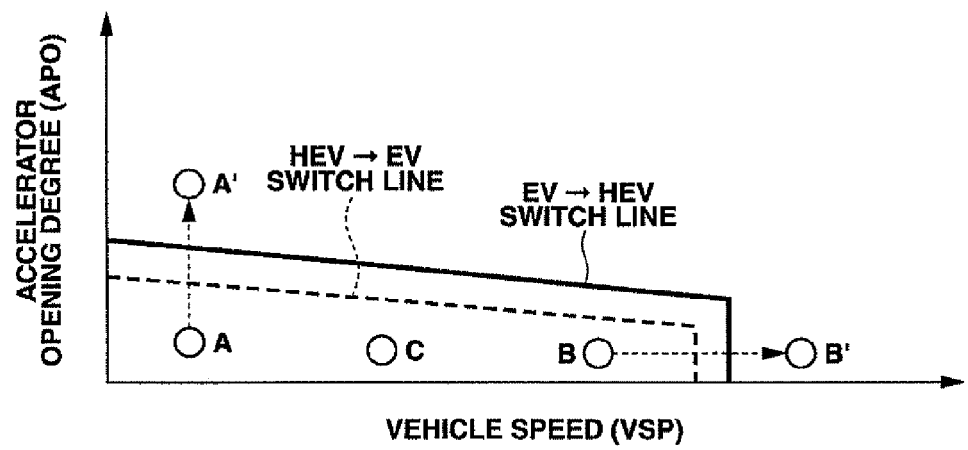
FIG. 5 is a graph showing an example of an EV-HEV selecting map to which the integrated controller refers.
Figure 6:
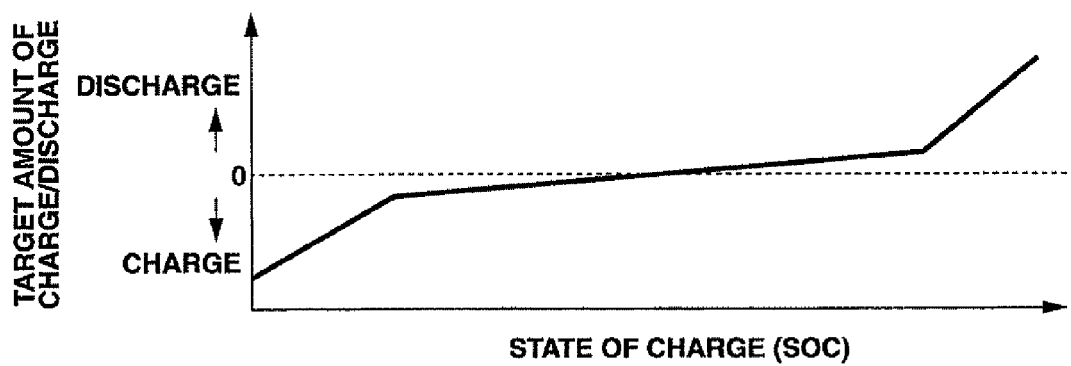
FIG. 6 is a graph showing an example of a charge/discharge amount map to which the integrated controller refers.
Figure 7:
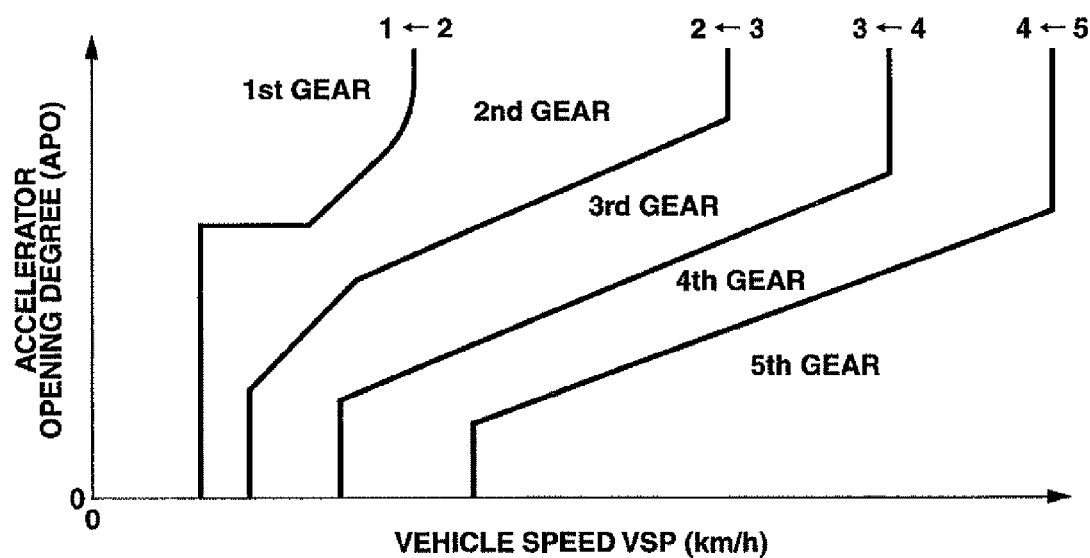
FIG. 7 is a graph of an example of a shift change pattern that can be employed at the time of shift change of a transmission.

A target driving force calculating section 31 calculates a target driving force (tFo0) based on an accelerator opening degree (APO) and vehicle speed (VSP) by using a target driving force map such as that shown in FIG. 4. A mode selecting section 32 calculates a target mode, either EV or HEV, based on an accelerator opening degree (APO) and vehicle speed (VSP) by using an EV-HEV selecting map such as that shown in FIG. 5. A target charge/discharge calculating section 33 calculates a target charge/discharge electric power (tP) based on the state of charge (SOC) of the battery 9 using the charge/discharge amount map such as that shown in FIG. 6. An operation point instructing section 34 receives the target driving force (tFo0), target mode, vehicle speed (VSP) and target charge/discharge electric power (tP), based on an accelerator opening degree (APO). From this data, the operation point instructing section 34 calculates operation point arriving targets of a transitional target engine torque, target motor/generator torque, target second clutch torque capacity, target automatic transmission shift and a first clutch solenoid current instruction. A shift change control section 35 controls the drive of the solenoid valve 15 within the automatic transmission 3 so as to attain those operating point arriving targets, based on the target second clutch torque capacity and the target automatic transmission shift. FIG. 7 is a graph showing an example of a shift change pattern that can be employed at the time of shift change of the stepped automatic transmission 3.

While description has been made of the basic control executed by the integrated controller 20, the integrated controller 20 further performs torque adjustment that discriminates between shift change operation (the time during which a shift change is taking place) and normal operation (the time during which no shift change is taking place) of the hybrid vehicle CR, thereby realizing a drive control that can deal with the problem at the time of shift change while aiming at improving the fuel consumption.

The integrated controller 20 controls the drive of the vehicle CR by supplying a combined torque, that is, the sum of torque on the engine 1 side and torque on the motor/generator 2 side, to the input side of the transmission 3. Herein, the combined torque is basically set based on a general expression (Ttotal=Te+Tm) by attaching greater importance to the fuel consumption. Namely, the engine torque is set at a basic engine torque value (so-called optimal fuel consumption point torque). Then, the basic motor torque value (Tm) is determined so that the target driving force (tFo0) can be obtained with the combined torque Ttotal. The drive control by the combined torque that is determined by this method is desirable from the point of view of improving the fuel consumption.

On the other hand, there can occur a case where the state of charge (SOC) of the battery 9 installed on the hybrid vehicle CR deviates to the overcharge side or the overdischarge side depending upon how the vehicle is used. If such a deviation of the state of charge of the battery 9 occurs, a degree of freedom of drive of the motor/generator 2 is restricted so that the motor/generator 2 operates only within a usable range of torque. For example, if there is, in the drive control of the vehicle, a request for increasing the regenerative torque of the motor/generator 2, such a request cannot be accommodated if the state of charge (SOC) of the battery 9 has deviated to the overcharge side, resulting in shift shock or the like. If the motor/generator 2 is unable to produce the necessary power torque or regenerative torque while operating in the usable range of torque, shift shock may be caused at the time of shift change. Generally, when the state of charge of the battery deviates from a proper value to the overcharge side or the overdischarge side, the above-described basic motor torque value that attaches greater importance to the fuel consumption is not used, thereby allowing the state of charge of the battery to return to the proper value. For example, when the state of charge of the battery deviates to the overdischarge side, the engine torque is increased to become larger than the above-described basic engine torque value, which is determined by calculation by attaching greater importance to the fuel consumption, thereby reducing the power torque required of the motor/generator 2. Further, the power torque of the motor/generator 2 may be set to be negative (that is, the motor/generator is regenerated), thereby elevating the state of charge of the battery and returning it to the proper value. Also in the hybrid vehicle of this embodiment, one can constantly monitor the state of charge of the battery 9 and keep the state of charge proper; however, constant execution of such measures causes the use of engine torque, which may negatively affect the fuel consumption efficiency.

Since torque variation is minimal during normal operation, it is possible to perform the drive control of the vehicle by the combined torque based on the torque basic value that attaches greater importance to the fuel consumption, and by this, it can be expected to attempt to improve the fuel consumption. On the other hand, since torque variation is relatively large during shift change operation, it is necessary to perform suitable torque adjustment. For this reason, it is desired to secure the state of charge of the battery 9, which allows the motor/generator 2 to be sufficiently used. Namely, when there is a deviation of the state of charge (SOC) of the battery 9, thus causing a condition where use of the motor/generator 2 is restricted, the state of charge of the battery 9 is returned to a standard state before shift change, thereby securing the state of charge of the battery 9, which allows the motor/generator 2 to be sufficiently used. By this, the drive control of the hybrid vehicle can attain both improvement of the fuel consumption and prevention of shift shock and the like caused at the time of shift change.

By using the above-described points as a basic general idea, the control by the integrated controller 20 of the drive control apparatus DRC is executed. Hereinbelow, the control by the integrated controller 20 will be described in detail.

The integrated controller 20 of the drive control apparatus DRC executes torque adjustment that causes a shift from the basic engine torque value that is set by attaching greater importance to the fuel consumption. This is referred to as a basic value shift process. The basic value shift process is a process for securing a degree of freedom of use of the motor/generator torque when the drive torque of the motor/generator 2 is restricted due to a deviation of the state of charge of the battery 9. In order to deal with shift shock at the time of shift change, the basic value shift process temporarily makes a shift from the basic engine torque value that attaches greater importance to the fuel consumption while maintaining the combined torque. This may also be understood as a process for temporarily shifting the constitutional ratio between the motor/generator side torque and the engine side torque of the combined torque from the basic engine torque value and basic motor/generator torque value respectively. When the basic value shift process is executed, the motor/generator 2 is driven suitably for charging/discharging while suppressing a deviation of the state of charge of the battery 9 or returning the state of charge to a standard state. By this, the state of charge (SOC) of the battery 9 is returned to a standard state that is neither overcharged nor overdischarged.

Hereinbelow, the drive control by the integrated controller 20 will be described more in detail by classifying the states of charge (SOC) of the battery 9 that are likely to result during running of the hybrid vehicle CR.

Figure 8:
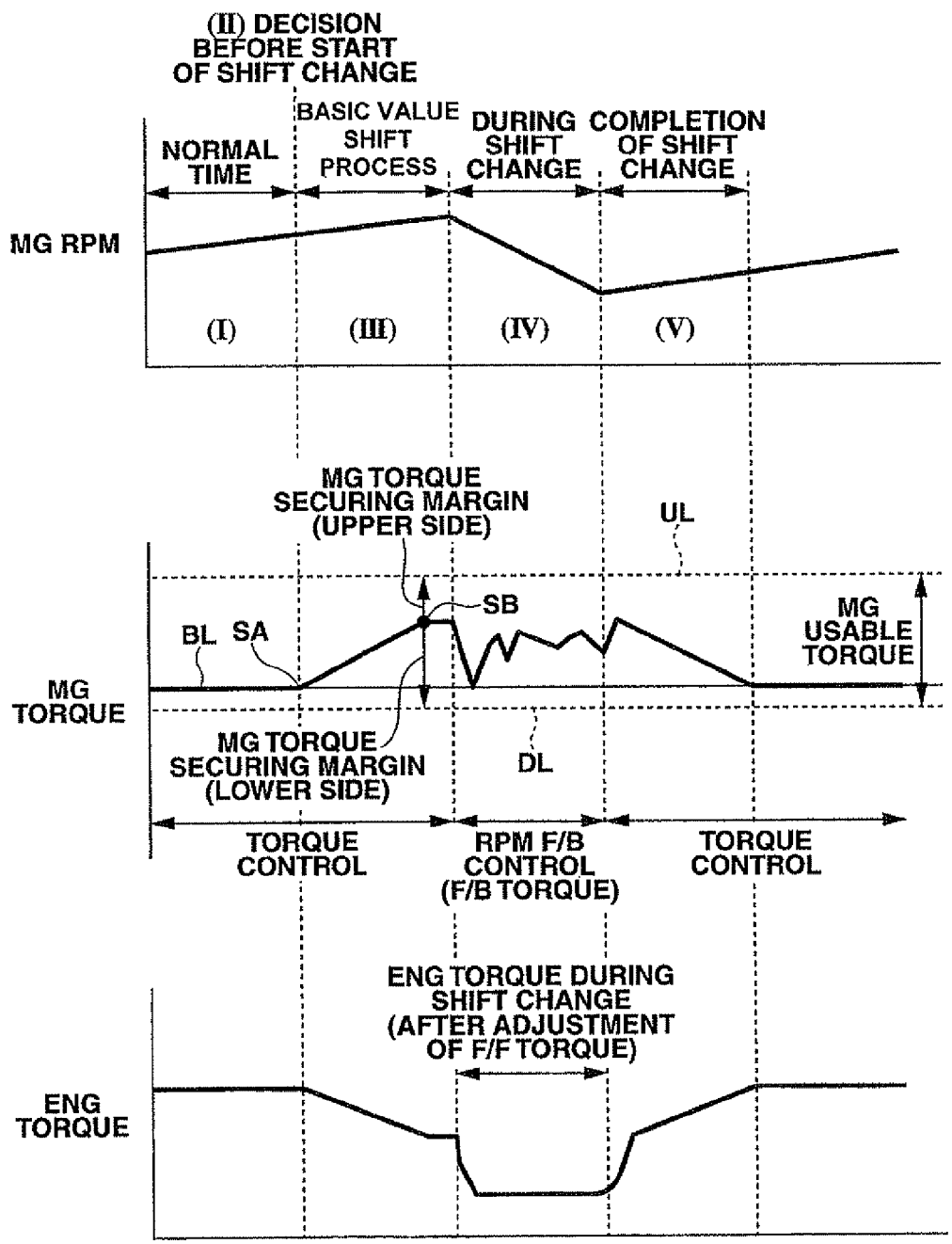
FIG. 8 is a time chart exemplarily showing the condition of a drive control by the integrated controller, under such circumstances that the state of charge of the battery is in a condition of being deviated to an overcharge side and an automatic transmission is upshifted.

FIG. 8 is a time chart showing a condition of a drive control by the integrated controller 20 where the state of charge of the battery is being deviated to an overcharge side and the automatic transmission 3 is being upshifted. This time chart shows a series of conditions (I) to (V) from the time the hybrid vehicle starts shift change during normal operation until the shift change is completed, while classifying the same. (I) indicates a period of normal operation, (II) indicates the time of decision before start of shift change, (III) indicates a shift process period for executing the basic value shift process, (IV) indicates a period during shift change operation, and (V) indicates a period of a shift change completion process. FIG. 8 shows RPM of the motor/generator (MG) in the upper chart, motor/generator (MG) torque in the middle chart and engine (ENG) torque in the lower chart in a way as to allow the time axes (horizontal axes) to coincide with each other.

During normal operation (I), the integrated controller 20 supplies to the transmission 3 a combined torque based on a basic target torque value that is calculated by the basic engine torque value (hereinafter referred to as ENG torque) and a basic motor/generator torque value (hereinafter referred to as MG torque) by attaching greater importance to the fuel consumption. During normal operation, the running condition of the vehicle is stable, and torque variation is relatively minimal. Thus, in this drive control apparatus DRC, the combined torque supplied to the transmission 3 is composed based on the above-described torque basic value, thereby aiming at simplifying the control and improving the fuel consumption. In the meantime, FIG. 8 shows a case where during normal operation (I), particular torque adjustment is not performed but predetermined combined torque is supplied to the input side of the transmission 3.

The integrated controller 20 monitors if there is shift change or not by reference to the outputs of the various sensors. The time chart in FIG. 8 shows a case where the integrated controller 20 makes a decision before start of shift change (II), and the transmission 3 is driven to make shift change. As shown in the figure, in the period (IV) during shift change operation, necessary torque is produced suitably by using torque based on the motor/generator 2 (MG torque) to execute RPM control accurately so that the shift shock and the like are suppressed.

In the time chart shown in FIG. 8, the basic value shift process period (III) is provided between the time (II) of decision before start of shift change and the period (IV) during shift change operation so that torque control by which a degree of freedom of the motor/generator 2 is secured can be performed in the period (IV) during shift change operation. In the shift process period (III), the basic value shift process is executed. The integrated controller 20 executes the basic value shift process as a pre-process so that necessary torque control can be executed by securing use of torque of the motor/generator 2 in the period (IV) during shift change operation.

In the meantime, the range in which the torque (MG torque) based on the motor/generator 2 can be used is, as shown in the center graph of FIG. 8, set as an area between an upper side limit line UL and a lower side limit line DL. If the current state of charge (SOC) is large, the upper side limit line UL and the lower side limit line DL are both shifted higher on the y-axis of the graph. And if the current state of charge (SOC) is small, the upper side limit line UL and the lower side limit line DL are both shifted lower on the y-axis of the graph. The limit lines are determined based on the current state of charge (SOC) accordingly. Since the combined torque is composed of the engine torque and the MG torque, the combined torque is determined on the assumption that the MG torque used for the RPM control is a value that can be obtained between the upper side limit line UL and the lower side limit line DL.

FIG. 8 shows the case where the state of charge (SOC) of the battery 9 deviates to the overcharge side. As shown in the center graph of FIG. 8, the lower side limit line DL of the motor/generator 2 is shifted close to the basic motor/generator torque value BL that has been employed during normal operation (I). That is to say, the torque margin shown as the difference between the state of charge (SOC) and the lower side limit line DL has been decreased.

In FIG. 8, when the state of charge (SOC) of the battery 9 is deviated to the overcharge side, the difference with respect to the lower side becomes small. In contrast, when the state of charge (SOC) of the battery 9 is deviated to the overdischarged side, the difference with respect to the upper side (UL) becomes small (refer to FIGS. 13 and 15 described hereinafter).

In the case shown in FIG. 8, if the combined torque that is set based on the basic motor/generator torque value BL (during normal operation (I)) is maintained, there is not any latitude on the lower side such that even if there is a request for producing regenerative torque (negative torque) by the motor/generator 2, the request cannot be dealt with.

Thus, in the shift process period (III), the basic value shift process for shifting the torque value of the motor/generator (MG) from the torque basic value is executed. More specifically, the integrated controller 20 drives the motor/generator 2 so that power torque is produced, thereby accelerating consumption of electric power of the battery 9. By this, the value of MG torque is shifted upwardly from the previous value SA that attaches greater importance to the fuel consumption to the upper side SB. In this manner, for making the motor/generator 2 produce power torque, it is needed, as shown in the bottom graph of FIG. 8, to decrease the torque produced on the engine side. By this, a combined torque is set based on a new torque ratio between the MG torque and engine torque.

When the integrated controller 20 detects that there is shift change, it confirms the state of charge of the battery 9 from the output of the SOC sensor 16. Whether the basic value shift process is executed or not depends upon whether the data indicating the state of change (SOC) of the battery deviates from an allowable range defined by a predetermined upper side SOC threshold value SOC (U) and a predetermined lower side SOC threshold value SOC (L) or not. The threshold values are set so that the basic value shift process is executed more easily at the time of shift change than at the normal time. More specifically, the allowable range of the state of charge of the battery is set smaller by setting the upper side SOC threshold value SOC (U) to be smaller and setting the lower side SOC threshold value SOC (L) to be larger at the time of shift change than at the normal time (refer to FIG. 11, described hereinafter). The difference between the torque basic value BL and the lower limit line DL is made large at the time of shift change because it is made easier to enter into the basic value shift process and the value of MG torque is shifted upwardly from the previous value SA.

Further, at the time of decision (II) before start of shift change, adjustment of the ENG torque and the MG torque may be started, and the shift change timing may be expected from the speed, acceleration and a predetermined speed change line of the vehicle CR. A timing at which the shift change control of the transmission 3 is started will also suffice. In such a case, torque adjustment may be performed by using a time lag until the second clutch 5 within the transmission 3 actually starts slipping. Further, it is desirable to perform the torque adjustment in the basic value shift process period (III) not in a stepped manner but smoothly at an adjustment speed within predetermined limits of variation rate, and it is more desirable to set the adjustment speed so as not to give a strange feel to a driver.

Further, in the shift change completion process period (V), the ENG torque and MG torque, having been adjusted due to shift change, are returned to the basic motor/generator torque value BL and basic engine torque value before adjustment, which attaches greater importance to the fuel consumption. It is desirable that the return of the adjusted torque is also performed not in a stepped manner but smoothly at an adjustment speed within predetermined limits of variation rate.

Further, in the case of upshift shown in FIG. 8, the integrated controller 20 is adapted to execute the basic value shift process as a pre-process so that the motor/generator 2 can produce necessary regenerative torque during shift change operation (IV) as shown at the middle part and can secure the torque for decreasing the input RPM. In the meantime, during shift change operation (IV), the ENG torque on the engine side is regulated by feedforward (F/F) adjustment, but the motor/generator 2 side can realize accurate RPM control by feedback (F/B) control of MG torque.

The example described with reference to FIG. 8 executes such torque adjustment so that where the battery 9 is in the state of charge deviated to the overcharge side (in a highly charged state), the torque on the engine side is decreased, and the torque on the motor/generator side is increased. By this, even in the case the state of charge of the battery 9 is deviated to the overcharge side, a degree of freedom of use of the motor/generator 2 is secured, and the RPM control of the transmission 3 can be performed. Accordingly, the RPM control that makes good use of the motor/generator 2 can be executed stably, and the shift change that suppresses shift shock can be executed assuredly.

In the meantime, where the state of charge of the battery 9 is deviated to the overdischarge side (in a low charge state), it will suffice to deal with the matter in the way opposite to that described above. Torque distribution is adjusted so that the torque on the engine side increases, and the torque on the motor/generator 2 side decreases (i.e., power generation for producing regenerative torque is attained).

The control executed by the integrated controller 20 is such that by detecting a shift change before the start of the shift change, the threshold value that allows the basic value shift process to be easily executed is set. Namely, the data indicating the state of charge of the battery are changed between the shift change operation and the normal operation and are set so that the basic value shift process is executed more easily during shift change operation. By this, the benefits that result from the shift change increases during shift change operation and decreases during normal operation. Accordingly, during shift change operation, shift shock can be suppressed, and during normal operation, improvement of fuel consumption can be pursued.

Figure 9:
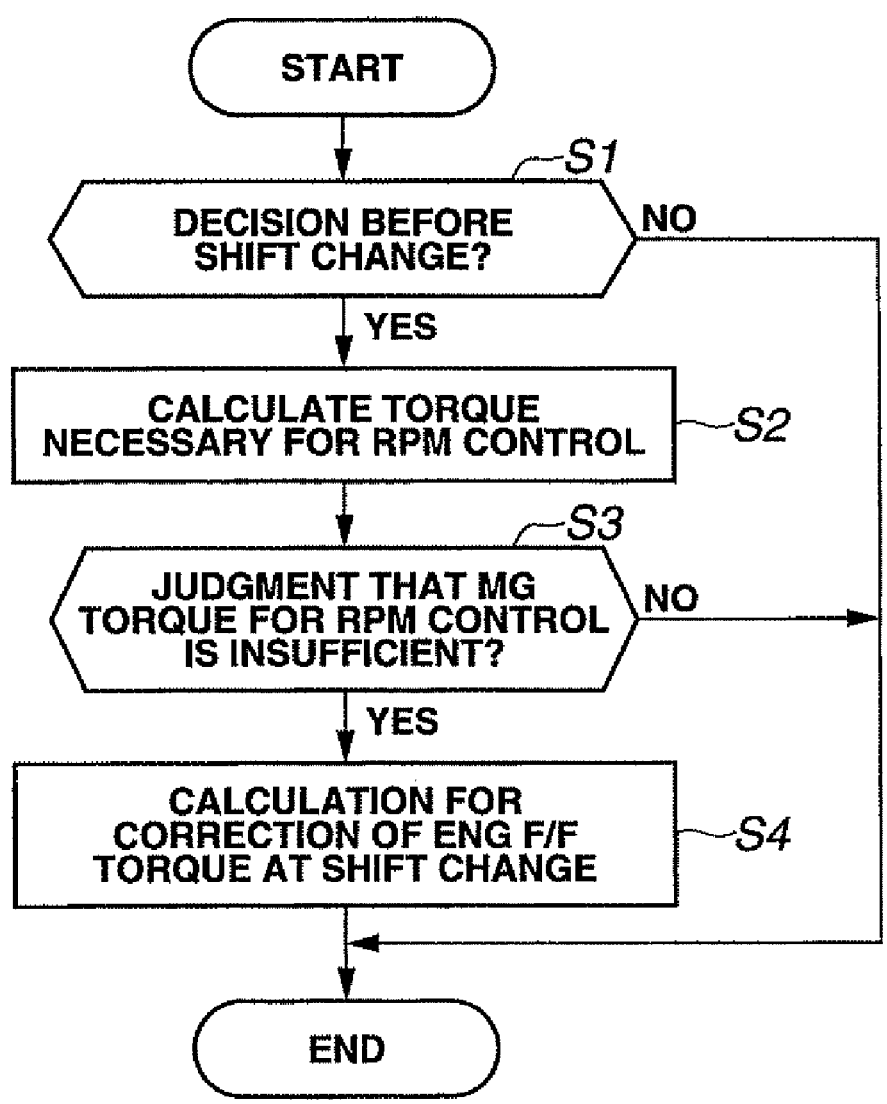
FIG. 9 is a flow chart showing an example of a process that is executed at the normal time (I) of FIG. 8, with decision before shift change.

FIGS. 9 to 12 are flowcharts showing various process steps of the integrated controller 20 that execute the control explained based on FIG. 8. FIG. 9 shows a process executed chiefly during normal operation (I), together with the decision before start of shift change (II). The flow chart shows that the integrated controller 20 executes the decision before start of shift change (II) periodically. If there is shift change (S1), a torque necessary for the RPM control that is executed by using the motor/generator 2 (S2) is calculated. A judgment is formed on an insufficient amount of the MG torque (S3), and this is calculated for correction by the feedforward (F/F)

control of the engine torque. By this, the basic value shift process can be executed by discriminating between normal operation and shift change operation.

Figure 10:
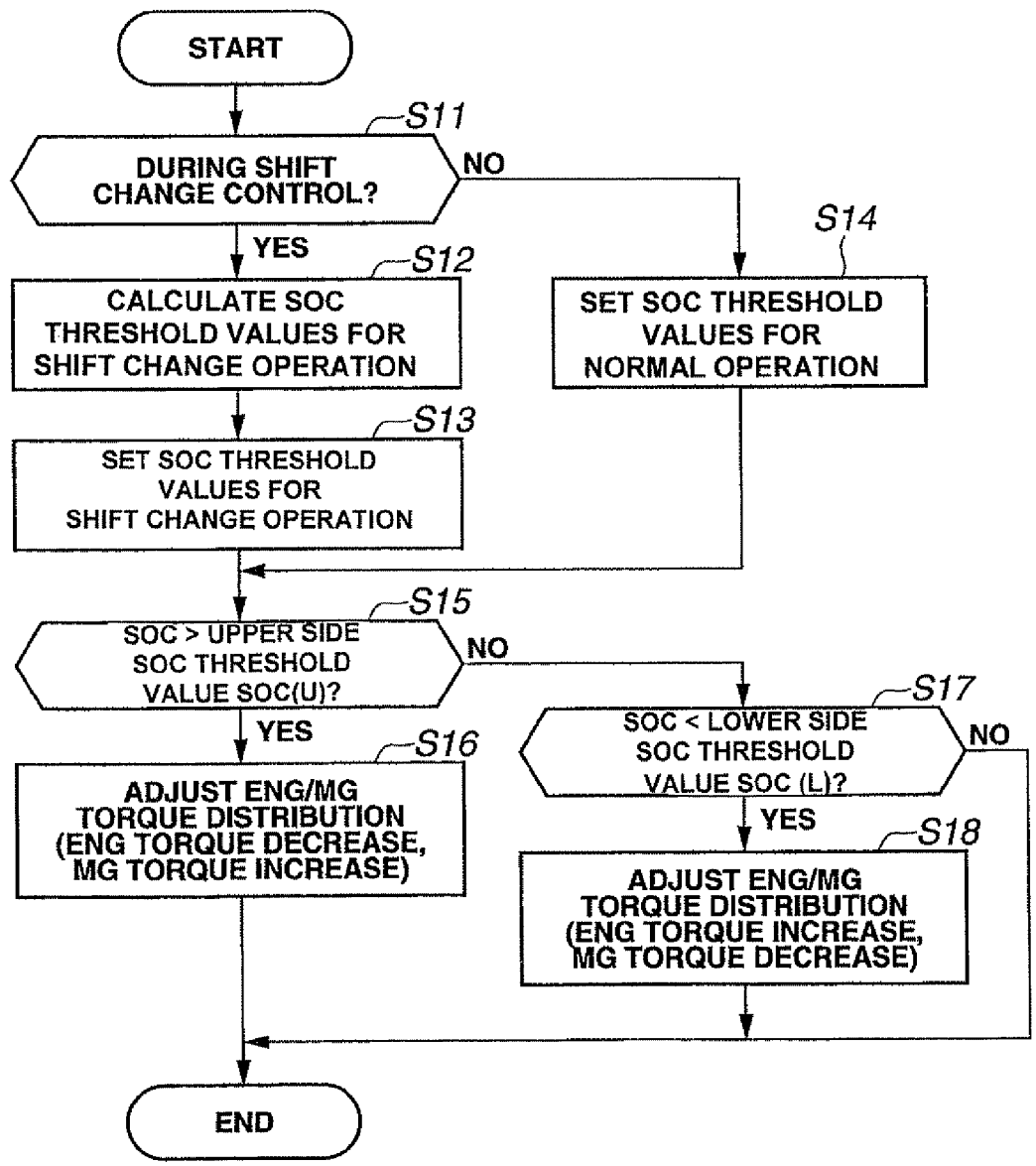
FIG. 10 is a flow chart showing an example of a process concerning a shift process period and a shift change operation of FIG. 8.
Figure 11:
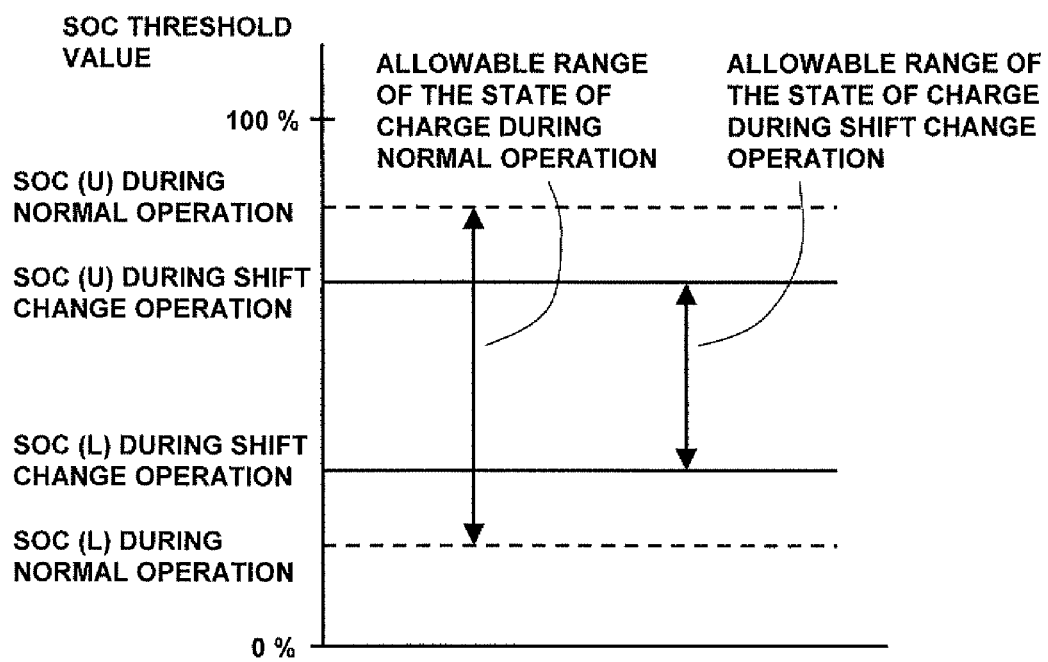
FIG. 11 is a map showing the setting of the SOC threshold values.

FIG. 10 is a flowchart showing the basic value shift process period (III) and the shift change operation period (IV). FIG. 11 is a map showing the setting of the SOC threshold values. In FIG. 10, after the integrated controller 20 judges that there is shift change, it is confirmed that the controller has entered into the shift change control (S11), and the SOC threshold values for shift change are calculated (S12) and set (S13). On the other hand, where there is no shift change, the SOC threshold values for normal operation are set (S14).

As described above, the threshold values are set so that the basic value shift change process is executed more easily during shift change operation than during normal operation. More specifically, as shown in FIG. 11, the upper side SOC threshold value SOC (U) is set to be smaller during shift change operation than during normal operation, so that the state of charge (SOC) of the battery 9 is more easily judged to be larger than the upper side SOC threshold value SOC (U) and a judgment on execution of the basic value shift process is formed more easily during shift change operation than during normal operation. Also, the lower side SOC threshold value SOC (L) is set to be larger during shift change operation than during normal operation, so that the state of charge (SOC) of the battery 9 is more easily judged to be smaller than the lower side SOC threshold value SOC (L) and a judgment on execution of the basic value shift process is formed more easily during shift change operation than during normal operation. That is to say, the allowable range of the state of charge of the battery is made smaller during shift change operation than during normal operation. Where the data indicates the state of charge (SOC) of the battery 9 is larger than the upper side SOC threshold value SOC (U) (S15), the integrated controller 20 makes a decision to execute the basic value shift process, and the engine torque is suppressed and the power torque on the motor/generator side is increased, thereby accelerating discharge of the battery (S16). On the other hand, where the data indicates the state of charge (SOC) of the battery 9 is smaller than the lower side SOC threshold value SOC (L) (S17), the integrated controller 20 makes a decision to execute the basic value shift process, and the engine torque is increased and the power torque on the motor/generator side is suppressed, thereby accelerating charge of the battery (S18). By this, a degree of freedom of use of the motor/generator 2 is secured.

Figure 12:
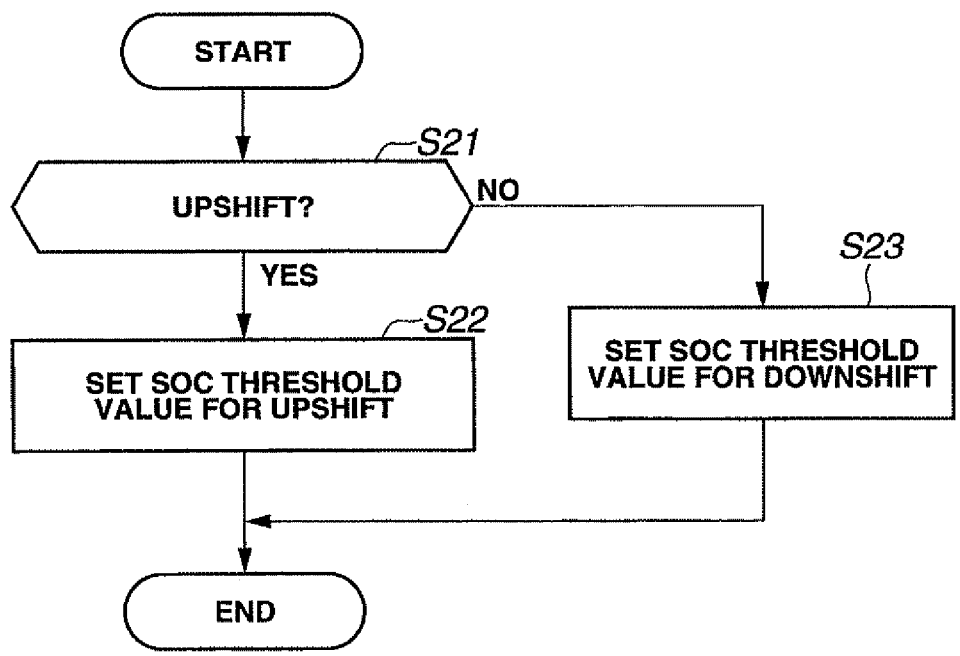
FIG. 12 is a flowchart of the integrated controller discriminating between the time of upshift and the time of downshift of an integrated controller and starting a basic value shift process.

FIG. 12 shows a flowchart for discriminating between the time of upshifting and the time of downshifting of an integrated controller and starting a basic value shift process. As shown in steps S22 and S23, it is possible that the integrated controller 20 sets the threshold values differently between the time of upshift and the time of downshift.

At the time of upshift, it is possible that only the upper side SOC threshold value SOC (U) that allows the basic value shift process to be started is set lower. And at the time of downshift, it is possible that only the lower side SOC threshold value SOC (L) is set higher. At the time of upshift it is required to decrease the input RPM to the transmission 3, and at the time of downshift it is required to increase the input RPM. When the state of charge (SOC) of the battery is deviated to the overcharge side, and an upshift requires the input RPM to decrease, the upper side SOC threshold value SOC (U) of the basic value shift process is lowered accordingly. Thus, even in the case where the state of charge is deviated to the overcharge side, use of the motor/generator 2 can be secured. On the other hand, when the state of charge (SOC) of the battery is deviated to the overdischarge side, and a downshift requires the input RPM to increase, the lower side SOC threshold value SOC (L) of the basic value shift process is raised accordingly. Thus, even in the case where the state of charge is deviated to the overdischarge side, use of the motor/generator 2 can be secured.

Figure 13:
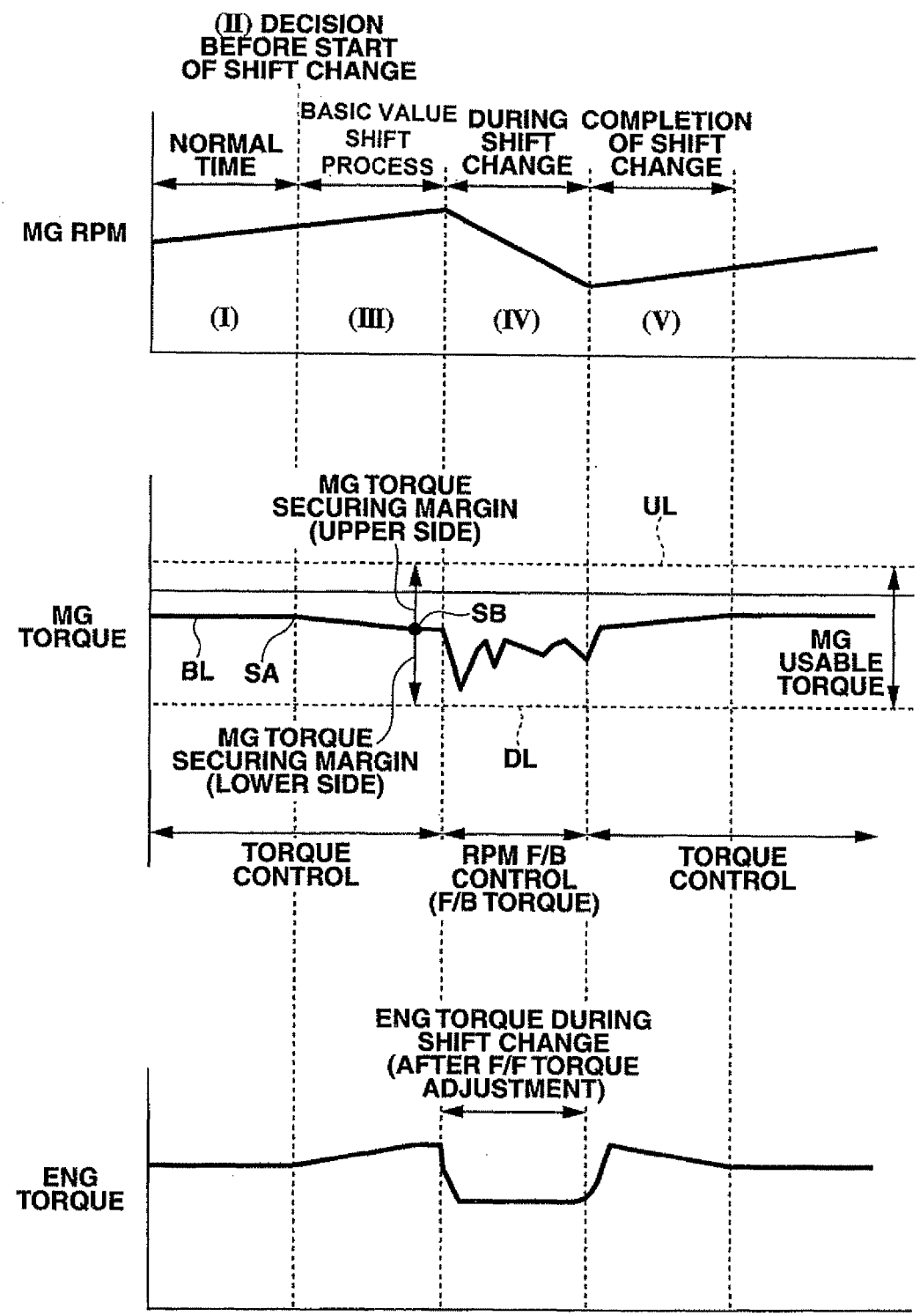
FIG. 13 is a time chart exemplarily showing the condition of a drive control that is executed by the integrated controller, under such circumstances that the state of charge of the battery is in a condition of being deviated to an overdischarge side and the transmission is upshifted.

FIG. 13 is a time chart exemplarily showing the condition of a drive control that is executed by the integrated controller 20, under such circumstances that the state of charge of the battery is in a condition of being deviated to an overdischarge side, and the automatic transmission 3 is upshifted. In FIG. 13, the transmission 3 is upshifted similarly to FIG. 8. Contrary to that previously shown in FIG. 8, though, the upshift is at the time the state of charge of the battery 9 is deviated to the overdischarge side. In FIG. 13, the state of charge at the time the integrated controller 20 has made the decision before shift change (II) is in a low state so that the difference up to the upper limit line UL has become small. Herein, the battery 9 is under unfavorable circumstances with respect to such an operation for producing power torque by discharge. Under such circumstances, the integrated controller 20 executes, in the shift process period (III), torque adjustment for elevating the output on the engine 1 side while at the same time lowering the output of the motor/generator 2. By this, electric power consumption of the motor/generator 2 is suppressed to be on the power generation side, thereby attempting to improve the state of charge of the battery 9. By such a basic value shift process, a degree of freedom of use of torque based on the motor/generator 2 is secured. The process by the integrated controller 20 thereafter is similar to that described above. Even under such circumstances that the state of charge of the battery 9 is deviated to the overdischarge side, and the transmission is upshifted, the drive control apparatus DRC can make shorter the time during shift change operation and suppress shift shock while attempting to improve fuel consumption.

Figure 14:
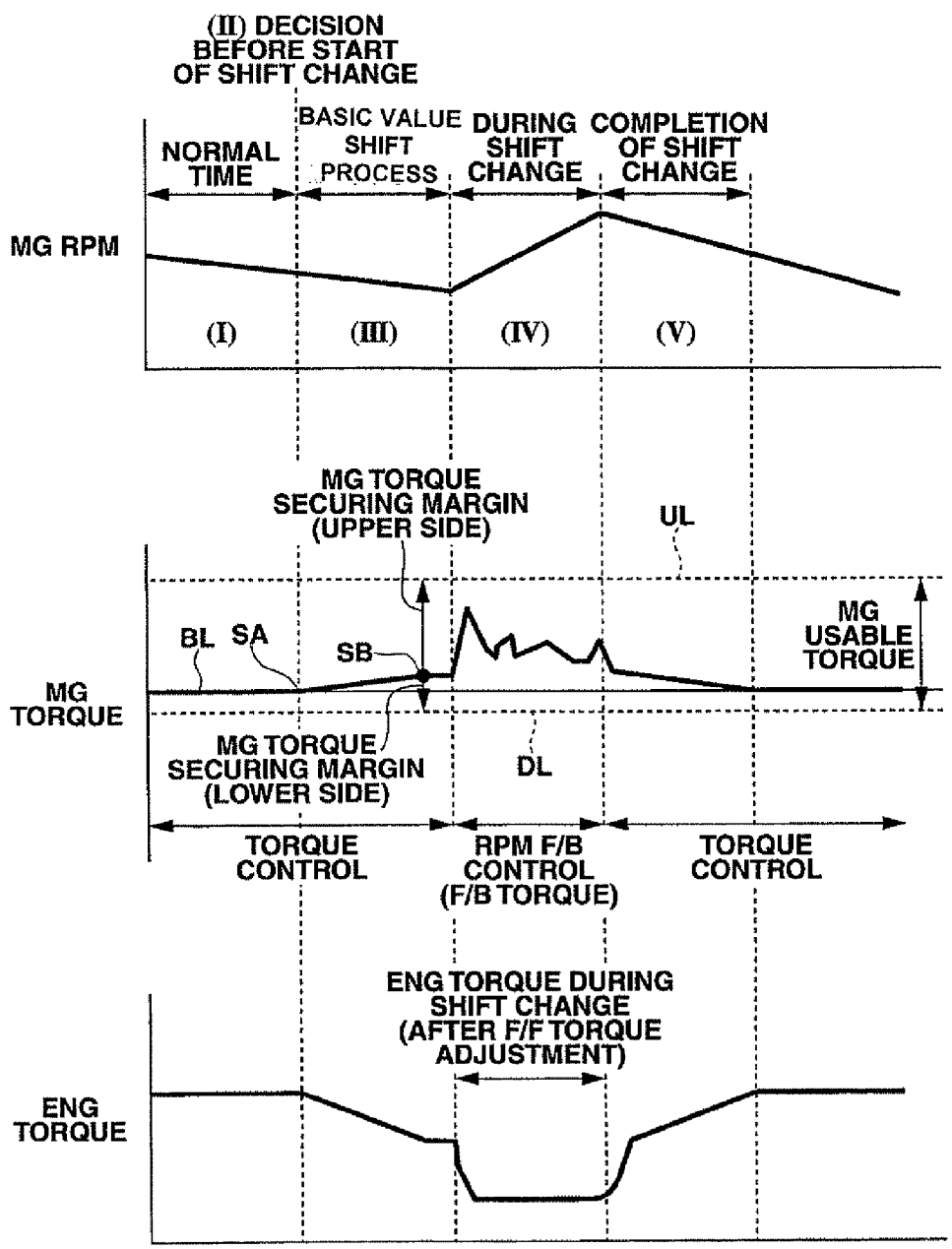
FIG. 14 is a time chart exemplarily showing the condition of a drive control executed by the integrated controller, under such circumstances that the state of charge of the battery is in a condition of being deviated to the overcharge side and the transmission is downshifted.
Figure 15:
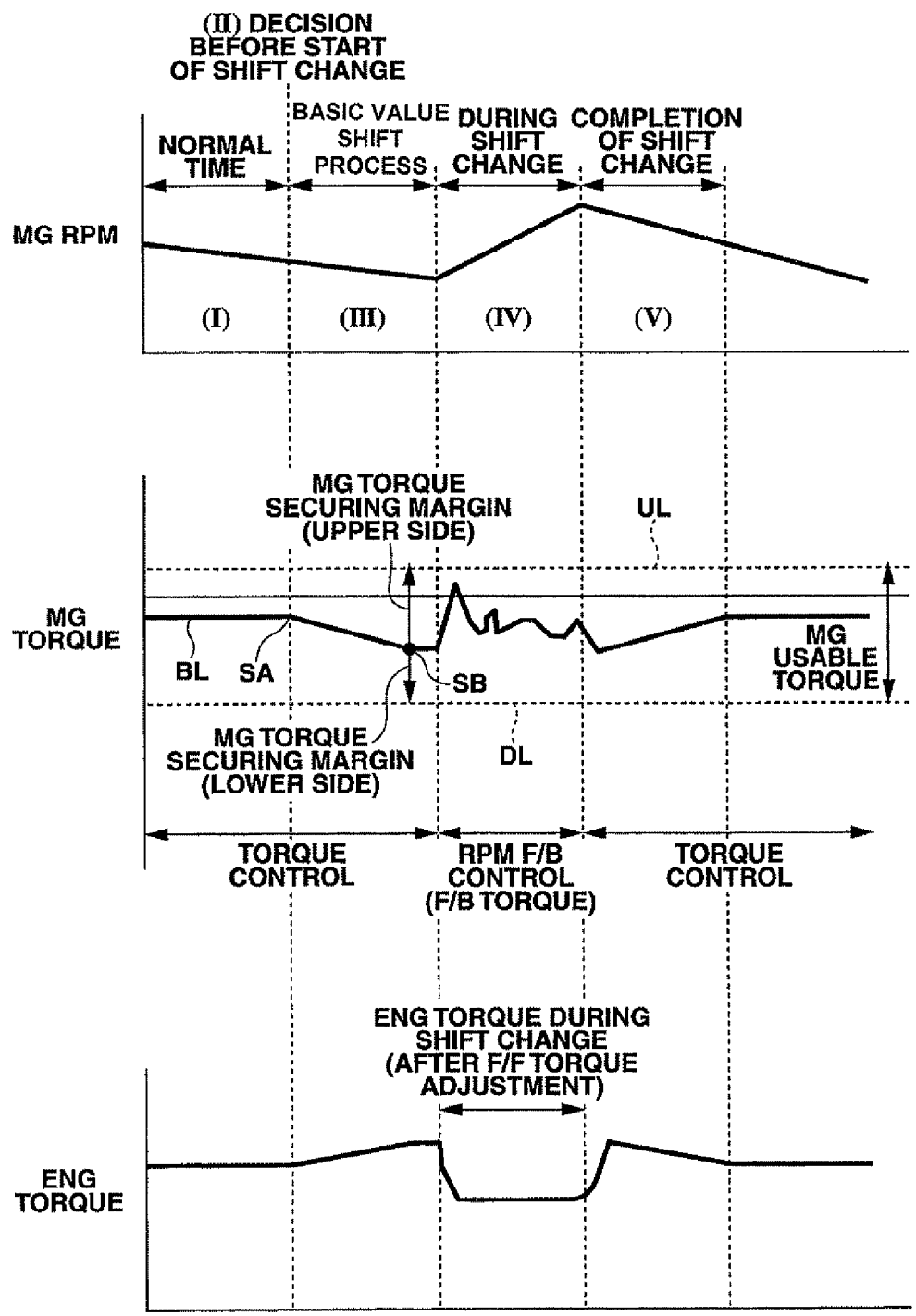
FIG. 15 is a time chart showing the condition of a drive control executed by the integrated controller, under such circumstances that the state of charge of the battery is in a condition of being deviated to the overdischarge side and the transmission is downshifted.

FIG. 14 is a time chart exemplarily showing the condition of a drive control that is executed by the integrated controller 20, under such circumstances that the state of charge (SOC) of the battery 9 is in a condition of being deviated to the overcharge side, and the automatic transmission 3 is downshifted. FIG. 15 is a time chart exemplarily showing the condition of a drive control that is executed by the integrated controller 20, under such circumstances that the state of charge (SOC) of the battery 9 is in a condition of being deviated to an overdischarge side, and the automatic transmission 3 is downshifted.

In the case of downshift, the motor/generator 2, opposite to the case of upshift, is able to secure the torque for elevating the input RPM of the transmission. Namely, in this case, the ENG torque and MG torque are adjusted so that the torque of the motor/generator 2 becomes a torque having a predetermined difference or more from the maximum power torque of the motor/generator 2. Other processing by the integrated controller 20 is similar to that described above. Even under the circumstances that the transmission is downshifted, the drive control apparatus DRC can make shorter the time during shift change operation and suppress shift shock while attempting to improve fuel consumption.

While embodiments of the invention have been described in detail, the invention is not limited to the particular embodiments, but various modifications and variations may be made thereto without departing from the scope of the invention.

As having been described above, it becomes possible to provide a drive control apparatus for a hybrid vehicle that can inhibit a problem arising during shift change operation while attempting to improve fuel consumption.

The above-described threshold value is set with respect to the data indicating the state of charge of the battery, and the above-described control changes the threshold value between shift change operation and normal operation, thereby making it possible to increase the opportunity that the basic value shift process is executed during shift change operation.

The control may be configured to execute the basic value shift process so that the torque on the motor/generator side becomes larger than the basic motor/generator torque value when the state of charge of the battery is deviated to the overcharge side, and the torque on the motor/generator side becomes smaller than the basic motor/generator torque value when the state of charge of the battery is deviated to the overdischarge side.

Further, the control may be configured to confirm the shift condition of the transmission and execute the basic value shift process so that in case of upshift, the motor/generator can secure the torque for lowering the input RPM of the transmission, and in case of downshift, the motor/generator can secure the torque for elevating the input RPM of the transmission.

By executing the basic value shift process and thereby optimizing use of the motor/generator, torque adjustment can be performed. Further, by considering the shift condition of the transmission and thereby making smaller the torque adjustment at the time of shift change, improvement of fuel consumption can be attained. The control can change the threshold value between the time of upshift and the time of downshift.

The control may execute the decision before shift change about whether shift change is made or not and thereby make a distinction between normal operation and shift change operation. While the torque adjustments have heretofore been performed without making a distinction between normal operation and shift change operation, a general ideal of a decision before shift change is introduced according to the invention herein, thereby making such a distinction and setting the respective threshold values for executing the basic value shift process. More specifically, regarding shift change operation, the conditions under which the control easily enters into the basic value shift process are set, and the state of charge of the battery can be revised. By this securing of the use of torque based on the motor/generator, the drive control of the vehicle can be executed accurately.

Further, the above-described hybrid vehicle is provided with a first clutch between the engine and the motor/generator and a second clutch between the motor/generator and the drive wheel, and the control may serve as a drive control apparatus for a hybrid vehicle that controls the drive of the first clutch and the second clutch, thereby executing the torque adjustment.

Accordingly, the above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A drive control apparatus for a hybrid vehicle, comprising:
   an engine;
   a motor-generator;
   a battery for supplying and receiving electric power to and from the motor-generator;
   a transmission configured to perform a normal operation and a shift change operation; and
   a controller configured to:
      detect the normal operation and the shift change operation of the transmission;
      determine a state of charge of the battery;
      calculate a target driving torque value and a basic engine torque value based on a driving condition of the vehicle;
      calculate a basic motor-generator torque value based on the basic engine torque value and the target driving torque value;
      set a target engine torque to be the basic engine torque value and set a target motor-generator torque as the basic motor-generator torque value when the state of charge of the battery is within an allowable range;
      set the allowable range of the state of charge of the battery to be smaller when the transmission is performing the shift change operation than when the transmission is performing the normal operation; and
      execute a basic value shift process when the state of charge of the battery deviates from the allowable range, wherein the basic value shift process suppresses deviation of the state of charge of the battery by shifting the target engine torque from the basic engine torque value and shifting the target motor-generator torque from the basic motor-generator torque value.

2. The drive control apparatus of claim 1 wherein the controller is further configured to:
   change an upper threshold value and a lower threshold value for determining whether the state of charge of the battery is within the allowable range when the transmission transitions from the normal operation to the shift change operation.

3. The drive control apparatus of claim 1, wherein the controller is further configured to:
   increase the target motor-generator torque value to a larger value than the basic motor-generator torque value when the controller is executing the basic value shift process and the state of charge is deviated to an overcharge side of the allowable range.

4. The drive control apparatus of claim 1, wherein the controller is further configured to:
   decrease the target motor-generator torque value to a smaller value than the basic motor-generator torque value when the controller is executing the basic value shift process and the state of charge is deviated to an overdischarge side of the allowable range.

5. The drive control apparatus of claim 1, wherein the controller is further configured to:
   detect an upshift condition and a downshift condition of the transmission.

6. The drive control apparatus of claim 5, wherein the controller is further configured to:
   set a lower threshold value of the allowable range to allow the motor-generator to supply the target motor-generator torque value corresponding to a decrease of the target driving torque value.

7. The drive control apparatus of claim 5, wherein the controller is further configured to:
   set an upper threshold value of the allowable range to allow the motor-generator to supply the target motor-generator torque value corresponding to an increase of the target driving torque value.

8. The drive control apparatus of claim 1, wherein the controller is further configured to:
   detect whether the transmission will perform the shift change operation immediately before the transmission begins performing the shift change operation.

9. The drive control apparatus of claim 1, further comprising:
- an engine clutch disposed between the engine and the motor-generator, wherein the vehicle operates in an electric drive mode by only power from the motor-generator when the engine clutch is released, and wherein the vehicle operates in a hybrid drive mode by power from both of the engine and the motor-generator when the engine clutch is engaged.

10. The drive control apparatus of claim 9, wherein the controller is further configured to:
- execute the basic value shift process when the vehicle is operating in the hybrid drive mode.

11. The drive control apparatus of claim 1, wherein the controller is further configured to:
- calculate the basic motor-generator torque value by subtracting the basic engine torque value from the target driving torque value.

12. A drive control method for a hybrid vehicle having an engine, a motor-generator, a battery for supplying and receiving electric power to and from the motor-generator, and a transmission configured to perform a normal operation and a shift change operation, the method comprising:
- detecting the normal operation and the shift change operation of the transmission;
- determining a state of charge of the battery;
- calculating a target driving torque value and a basic engine torque value based on a driving condition of the vehicle;
- calculating a basic motor-generator torque value based on the calculated basic engine torque value and the calculated target driving torque value;
- setting a target engine torque to be the basic engine torque value and setting a target motor-generator torque as the basic motor-generator torque value when the determined state of charge of the battery is within an allowable range;
- setting the allowable range of the state of charge of the battery to be smaller when the transmission is performing the shift change operation than when the transmission is performing the normal operation; and
- executing a basic value shift process when the state of charge of the battery is deviated from the allowable range, wherein the basic value shift process suppresses deviation of the state of charge of the battery by shifting the target engine torque from the basic engine torque value and shifting the target motor-generator torque from the basic motor-generator torque value.

13. The drive control method of claim 12, further comprising:
- changing an upper threshold value and a lower threshold value for determining whether the state of charge of the battery is within the allowable range when the transmission transitions from the normal operation to the shift change operation.

14. The drive control method of claim 13, further comprising:
- increasing the target motor-generator torque value to a larger value than the basic motor-generator torque value when the controller is executing the basic value shift process and the state of charge is deviated to an overcharge side of the allowable range.

15. The drive control method of claim 13, further comprising:
- decreasing the target motor-generator torque value to a smaller value than the basic motor-generator torque value when the controller is executing the basic value shift process and the state of charge is deviated to an overdischarge side of the allowable range.

16. The drive control method of claim 13, further comprising:
- detecting an upshift condition and a downshift condition of the transmission.

17. The drive control method of claim 16, further comprising at least one of:
- setting a lower threshold value of the allowable range to allow the motor-generator to supply the target motor-generator torque value corresponding to a decrease of the target driving torque value; and
- setting an upper threshold value of the allowable range to allow the motor-generator to supply the target motor-generator torque value corresponding to an increase of the target driving torque value.

18. The drive control method of claim 13, further comprising:
- detecting whether the transmission will perform the shift change operation immediately before the transmission begins performing the shift change operation.

19. The drive control method of claim 13 wherein the vehicle further includes an engine clutch disposed between the engine and the motor-generator, wherein the vehicle operates in an electric drive mode by only power from the motor-generator when the engine clutch is released, and wherein the vehicle operates in a hybrid drive mode by power from both of the engine and the motor-generator when the engine clutch is engaged, the method further comprising:
- executing the basic value shift process when the vehicle is operating in the hybrid drive mode.

20. The drive control method of claim 13, further comprising:
- calculating the basic motor-generator torque value by subtracting the basic engine torque value from the target driving torque value.

* * * * *